W. H. STRANGE.
ELECTRIC FLOOR SCRUBBING MACHINE.
APPLICATION FILED SEPT. 8, 1906.
990,506.
Patented Apr. 25, 1911.
2 SHEETS—SHEET 1.
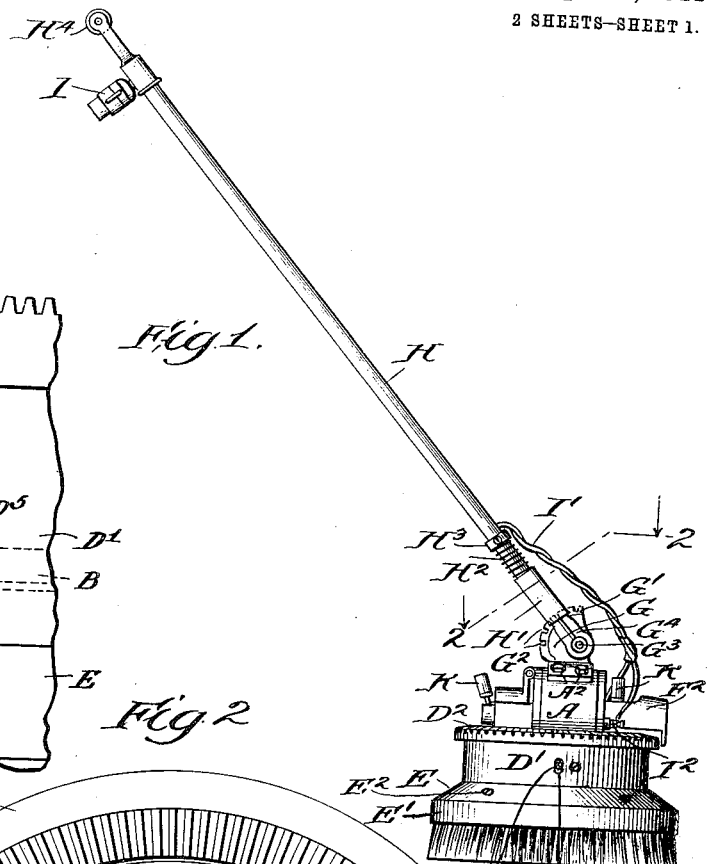
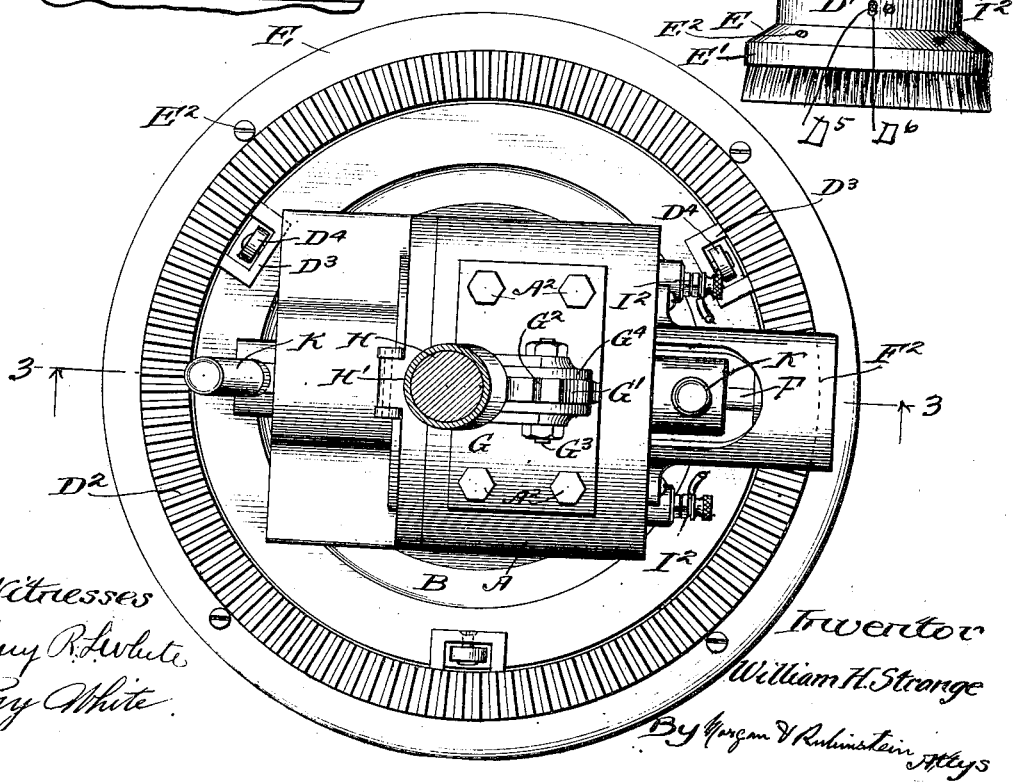

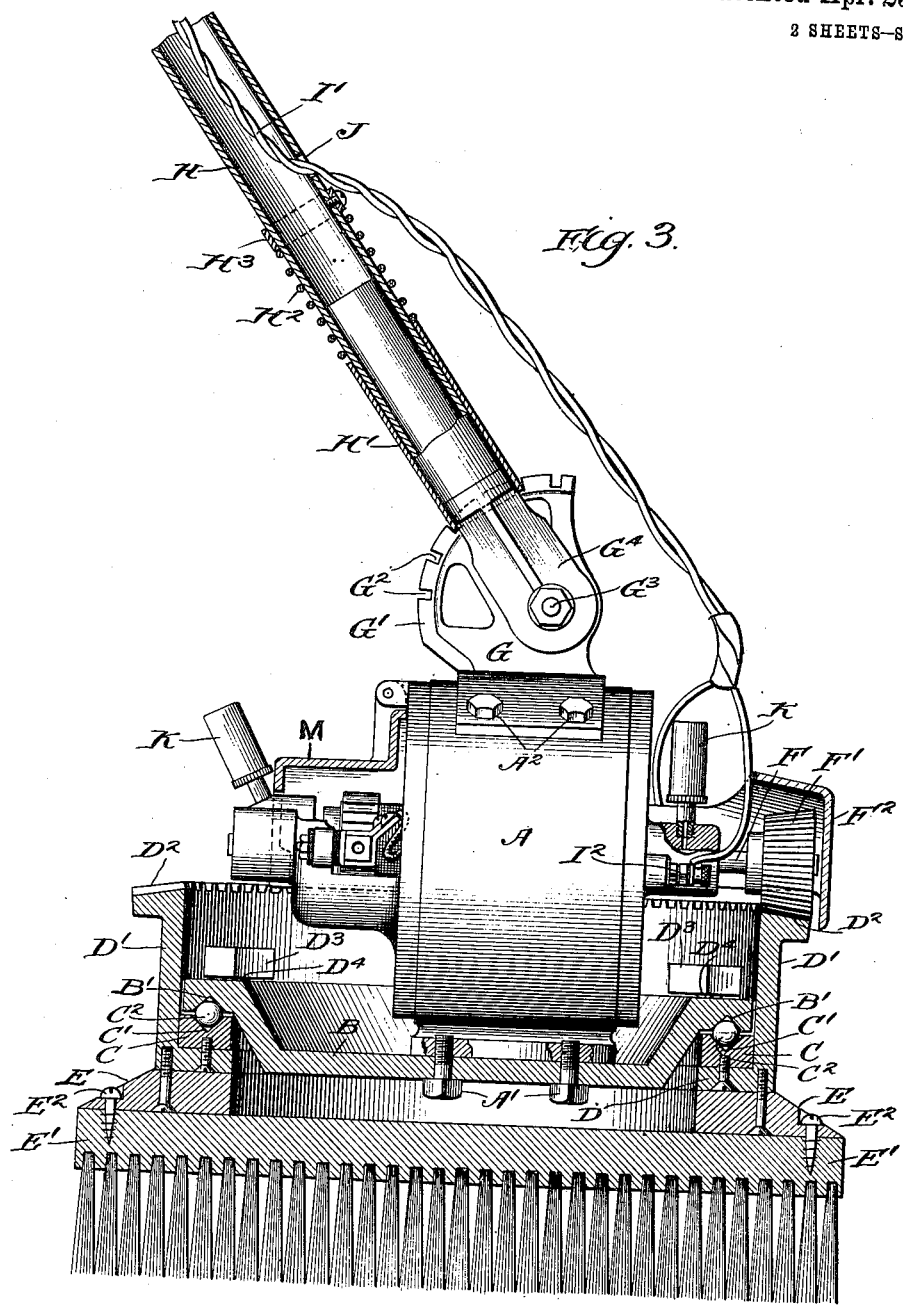

UNITED STATES PATENT OFFICE.

WILLIAM H. STRANGE, OF CHICAGO, ILLINOIS.

ELECTRIC FLOOR-SCRUBBING MACHINE.

990,506.  Specification of Letters Patent.  Patented Apr. 25, 1911.

Application filed September 8, 1906. Serial No. 333,858.

*To all whom it may concern:*

Be it known that I, WILLIAM H. STRANGE, a citizen of the United States, residing at 3721 Elmwood avenue, in the city of Chicago, county of Cook, and State of Illinois, have invented a new and useful Improvement in Electric Rotary Floor Surfacing, Scrubbing, and Polishing Machines, of which the following is a specification.

The object of my invention is to produce an antifrictional, adjustable, simple, cheap and perfect machine of the kind described.

The manner in which I accomplish my object is described in the following specification and illustrated in the accompanying drawings, in which:

Figure 1 is a side elevation of my improved machine complete and in position for connection with an incandescent electric light fixture, or other electric supply. Fig. 2 is a top plan view, the handle being shown in section on the line 2—2 Fig. 1. Fig. 3 is a vertical-sectional view on the line 3—3 Fig. 2. Fig. 4 is an enlarged fragmentary detail illustrating the means for adjusting the rollers.

In the drawings A designates the frame or casing of an electric motor. Secured to the bottom of the case A by the screws $A^1$ is a disk B. This disk is constructed with an annular channel $B^1$ shaped transversely like an inverted V as shown in Fig. 3. Directly beneath this disk B is an annular ring C having an annular V shaped channel $C^1$ corresponding with the channel $B^1$. These channels form a race filled with antifriction balls $C^2$ which form the horizontal circular bearing on which the weight of the electric motor rests. The ring C is supported on the inside of a circular flange D which forms the bottom edge of the cylindrical body $D^1$, the top edge of which forms a bevel gear $D^2$. In the interior of the cylindrical body $D^1$ are three adjustable roller bearings $D^3$ supporting rollers $D^4$. These bearings are secured to the body $D^1$ each by two screws $D^5$ extending through the body $D^1$. One of the holes $D^6$ for one of the screws for each of these bearings is slightly elongated vertically as shown in Fig. 1 and thereby permits one side of each bearing to be raised or lowered and the roller in each of said bearings to be thereby adjusted above the disk B as to just clear the disk when the machine is in motion. These rollers so adjusted are adapted to engage the disk B whenever the machine is tipped on one side or lifted upward and to thereby prevent a displacement of the ball race and balls therein. Attached by suitable screws to the bottom of the flange D of the cylindrical body $D^1$ is a ring of wood E. This ring forms a base to which a scrubbing brush $E^1$ is secured as shown, and to which surfacing and polishing tools and materials can be attached either by the wood screws $E^2$ as shown, or by any equivalent means. Secured on one end of the shaft F of the electric motor is a beveled pinion $F^1$ which meshes into the bevel gear $D^2$ and transmits the motion of the motor to the cylindrical body $D^1$, rings C and E and the scrub-brush $E^1$. The pinion $F^1$ is inclosed in a cover $F^2$ as shown in Fig. 1. Affixed to the top of the motor casing A by screws $A^2$ is a segmental handle joint G adapted for the pivotal support of a handle. The semi-circular edge $G^1$ of this support is indented with notches $G^2$, which are adapted in form and arrangement to receive the end of a locking sleeve hereinafter described. Pivotally secured to the support G by a pivot bolt $G^3$ is a fork $G^4$ which forms the pivot end of a handle bar H. Slidable on that end of the handle is a sleeve $H^1$. This sleeve is engaged and pressed down by a coiled spring $H^2$ which encircles the handle bar and is held in position by the ring $H^3$ which is secured on the handle by the screw which passes through the ring and handle. Under the pressure of this spring the bottom edge of the sleeve is held in the notches in the edge of the segmental joint. By raising the sleeve the handle is released and can be instantly set at any angle desired as shown in Fig. 1.

The handle bar H is formed of a tube and is provided at the top end with a suitable hand hold $H^4$. Just below the hand hold $H^4$ is an ordinary threaded incandescent electric globe holder and switch I, adapted for connection with a suitable cable and plug for the supply and control of the electric current. Connected with this holder and switch is a cable $I^1$ extending down inside the handle bar and through an aperture J. This cable is connected with the posts $I^2$ of the motor as shown in Fig. 1. The cylindrical cups K are oiling cups for the shaft of the motor, and the hinged piece M forms part of the casing covering the motor.

In my device any suitable motor having a horizontal shaft can be used, and I make no claim to such motor or its parts excepting in the direct connection of the motor shaft to the rotary head by means of the pinion on the motor shaft; and to the attachment of the handle to the motor casing as described.

What I claim and desire to secure by Letters Patent is:

1. The combination with an electric motor, its shaft and casing, of a pinion affixed on said shaft, a disk forming the base of said motor, a rotary head supporting said disk and comprising a cylindrical gear adapted to mesh with said pinion, rollers secured in said head in engagement with said disk, means for adjustably supporting said rollers in said head, and means attached to said head adapted to support surfacing, scrubbing and polishing tools and devices.

2. In a machine of the kind described, the combination with an electric motor having a horizontal shaft and pinion thereon, and a disk forming the base of said motor, of a cylindrical gear adapted to inclose and support said disk, said gear being in mesh with said pinion on said shaft and thereby rotated, means intermediate of said cylindrical part of said gear and marginal part of said disk adapted to prevent frictional contact of said parts, means adjustably secured in said gear adapted to maintain the relative position of said disk and said gear, and means secured to the bottom part of said gear adapted to support surfacing, scrubbing and polishing instruments and materials.

3. The combination with an electric motor, its shaft, pinion, casing and circular base; of a cylindrical gear inclosing said base and in engagement with said pinion, anti-friction balls intermediate of said gear and said base; means for keeping said gear and pinion in mesh, and said balls in place between said base and gear; means on said gear adapted to support surfacing, scrubbing and polishing tools; and a handle secured to said casing.

WILLIAM H. STRANGE.

Witnesses:
JOSEPH STAAB,
THOMAS J. MORGAN.